(12) United States Patent
Hara et al.

(10) Patent No.: US 7,672,977 B2
(45) Date of Patent: Mar. 2, 2010

(54) IMAGE REPRODUCING APPARATUS, METHOD OF CONTROLLING SAME AND CONTROL PROGRAM THEREFOR

(75) Inventors: Toshita Hara, Tokyo (JP); Noriko Katayama, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 365 days.

(21) Appl. No.: 11/790,246

(22) Filed: Apr. 24, 2007

(65) Prior Publication Data
US 2007/0257993 A1 Nov. 8, 2007

(30) Foreign Application Priority Data
Apr. 25, 2006 (JP) ............... 2006-119993

(51) Int. Cl.
*G06F 17/30* (2006.01)
(52) U.S. Cl. .................... 707/104.1; 707/205
(58) Field of Classification Search ........ 382/294, 382/118; 348/207.11, 231.3, 222.1, 552
See application file for complete search history.

(56) References Cited

U.S. PATENT DOCUMENTS

| | | | | |
|---|---|---|---|---|
| 5,657,433 A | * | 8/1997 | Murase et al. | 345/642 |
| 5,909,551 A | * | 6/1999 | Tahara et al. | 709/231 |
| 6,070,161 A | * | 5/2000 | Higashio | 707/4 |
| 6,154,218 A | * | 11/2000 | Murase et al. | 345/619 |
| 6,243,171 B1 | * | 6/2001 | Haneda | 358/115 |
| 6,507,371 B1 | * | 1/2003 | Hashimoto et al. | 348/552 |
| 6,999,117 B2 | * | 2/2006 | Yamazaki | 348/222.1 |
| 7,106,887 B2 | * | 9/2006 | Kinjo | 382/118 |
| 7,154,538 B1 | * | 12/2006 | Fukasawa et al. | 348/211.3 |
| 7,467,222 B2 | * | 12/2008 | Kacker | 709/232 |
| 2002/0191087 A1 | * | 12/2002 | Hashimoto et al. | 348/231.3 |
| 2003/0214670 A1 | * | 11/2003 | Ohmura | 358/1.15 |
| 2006/0203261 A1 | * | 9/2006 | Kacker | 358/1.6 |
| 2007/0057933 A1 | * | 3/2007 | Ohno et al. | 345/204 |
| 2008/0180532 A1 | * | 7/2008 | Ohmura | 348/207.11 |
| 2008/0260289 A1 | * | 10/2008 | Hara et al. | 382/294 |
| 2008/0309795 A1 | * | 12/2008 | Mitsuhashi et al. | 348/231.99 |

FOREIGN PATENT DOCUMENTS

| | | |
|---|---|---|
| JP | 8-329135 A | 12/1996 |
| JP | 11-224262 A | 8/1999 |
| JP | 2005-275738 A | 10/2005 |

* cited by examiner

*Primary Examiner*—Jean M Corrielus
(74) *Attorney, Agent, or Firm*—Birch, Stewart, Kolasch & Birch, LLP (57) ABSTRACT

A number of images are grouped and recorded in an image database. A main image is displayed in a main display area. Images having both "PORTRAIT" and "BEACH" photographic scenes, which have been assigned to the main image, assigned thereto are found in groups different from the group to which the main image belongs. The images found are displayed in an auxiliary display area as related images.

7 Claims, 13 Drawing Sheets

PHOTOGRAPHIC-SCENE CANDIDATES

PORTRAIT
FLOWER
FOLIAGE
SKY
AUTUMNAL TINTS
LANDSCAPE
BEACH
SNOW
SUNSET
NIGHT SCENE
FIREWORKS
PARTY
PET
CUISINE
BUILDING
VEHICLE
TEXT

PHOTOGRAPHIC SCENE
  DEGREE OF PERTINENCE
PORTRAIT
  ☆☆☆
CUISINE
  ☆
SHOOTING DATE
  AUGUST 10, 2005
SHOOTING TIME
  13 : 05
GROUP
  AUGUST 10,2005,
  AFTERNOOON

Fig. 6

PHOTOGRAPHIC SCENE
  DEGREE OF PERTINENCE
LANDSCAPE
  ☆☆☆
SKY
  ☆
SHOOTING DATE
  SEPTEMBER 20, 2005
SHOOTING TIME
  16 : 08
GROUP
  SEPTEMBER 20, 2005,
  EVENING

*Fig. 7*

PHOTOGRAPHIC SCENE
  DEGREE OF PERTINENCE
VEHICLE
  ☆☆☆
PET
  ☆☆☆
SHOOTING DATE
  OCTOBER 10, 2005
SHOOTING TIME
  10 : 15
GROUP
  OCTOBER 10, 2005,
  MORNING

*Fig. 8*

PHOTOGRAPHIC SCENE
  DEGREE OF PERTINENCE
LANDSCAPE
  ☆☆
PORTRAIT
  ☆☆☆
SHOOTING DATE
  NOVEMBER 3, 2005
SHOOTING TIME
  18 : 30
GROUP
  NOVEMBER 3, 2005,
  NIGHT

IMAGE REPRODUCING APPARATUS, METHOD OF CONTROLLING SAME AND CONTROL PROGRAM THEREFOR

BACKGROUND OF THE INVENTION

1. Field of the Invention

This invention relates to an image reproducing apparatus, a method of controlling this apparatus and a control program therefor.

2. Description of the Related Art

As digital still cameras have become convenient and easy to use, users are now capable of taking pictures with ease. This has resulted in the storage of images of a large number of frames and instances where there are many images that are not viewed. Various techniques for viewing images have been devised for this reason. For example, there is a technique for laying out images in accordance with image attributes (see the specification of Japanese Patent Application Laid-Open No. 8-329135) and a technique for specifying search conditions and searching for images having conditions different from the specified search conditions (see the specification of Japanese Patent Application Laid-Open No. 11-224262).

Further, there is an image search system that reconciles both reliability and contingencies when image data is searched (see the specification of Japanese Patent Application Laid-Open No. 2005-275738).

However, these conventional systems and techniques are unsatisfactory in terms of finding and displaying images related to a desired image.

SUMMARY OF THE INVENTION

Accordingly, an object of the present invention is to find and display images related to a desired image.

According to the present invention, the foregoing object is attained by providing an image reproducing apparatus comprising: a first reading device for reading image data and keyword data representing a desired image from a recording medium on which a number of sets of image data and keyword data have been grouped and recorded, the image data representing an image obtained by picture taking and the keyword data representing a keyword of the image, the image data and keyword data in each set being interrelated; a first display control device for controlling a display device in such a manner that the main image represented by the image data read by the first reading device is displayed on a display screen; a command input device for inputting a related-image display command; a second reading device for reading, from the recording medium in response to the related-image display command that has been input from the command input device, image data which is related to keyword data indicative of a keyword identical with the keyword of the main image being displayed under the control of the first display control device, and which is contained in groups different from the group to which the main image belongs; a first reducing device for reducing the image, which is represented by the image data that has been read by the second reading device, to a size smaller than that of the main image; and a second display control device for controlling the display device in such a manner that the image reduced in size by the first reducing device is displayed as a related image on the display screen displaying the main image.

The present invention also provides a control method suited to the above-described image reproducing apparatus. Specifically, the present invention provides a method of controlling an image reproducing device, comprising the steps of: reading by a first reading device image data and keyword data representing a desired image from a recording medium on which a number of sets of image data and keyword data have been grouped and recorded, the image data representing an image obtained by picture taking and the keyword data representing a keyword of the image, the image data and keyword data in each set being interrelated; controlling a display device by a first display control device in such a manner that the main image represented by the image data read by the first reading device is displayed on a display screen; reading by a second reading device, from the recording medium in response to a related-image display command that has been input, image data which is related to keyword data indicative of a keyword identical with the keyword of the main image being displayed under the control of the first display control device, and which is contained in groups different from the group to which the main image belongs; reducing the image, which is represented by the image data that has been read by the second reading device, to a size smaller than that of the main image by a reducing device; and controlling the display device in such a manner that the image reduced in size by the reducing device is displayed as a related image on the display screen displaying the main image.

The present invention also provides a program for implementing the above-described method of controlling the image reproducing apparatus.

In accordance with the present invention, sets of image data and keyword data are grouped and recorded on a recording medium. Desired image data is read from the recording medium and the image represented by the read image data is displayed as a main image on a display screen. If a related-image display command is input, image data representing an image belonging to a group different from the group to which a main image belongs, which image has a keyword the same as that of the main image (in a case where the main image has a plurality of keywords, the keyword of the image may match all of the plurality of keywords or at least one of these keywords), is read from the recording medium. The image represented by the read image data is reduced in size so as to become smaller than the main image and the reduced image is displayed on the display screen that is displaying the main image. An image related to the main image can be found and displayed.

The apparatus may further comprise a selecting device for selecting the related image; a second reducing device for reducing an image, which is represented by image data contained in a group to which image data representing the related image selected by the selecting device belongs, to a size smaller than that of the main image; and a third display control device for controlling the display device in such a manner that the image reduced in size by the second reducing device is displayed on the display screen that is displaying the main image.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
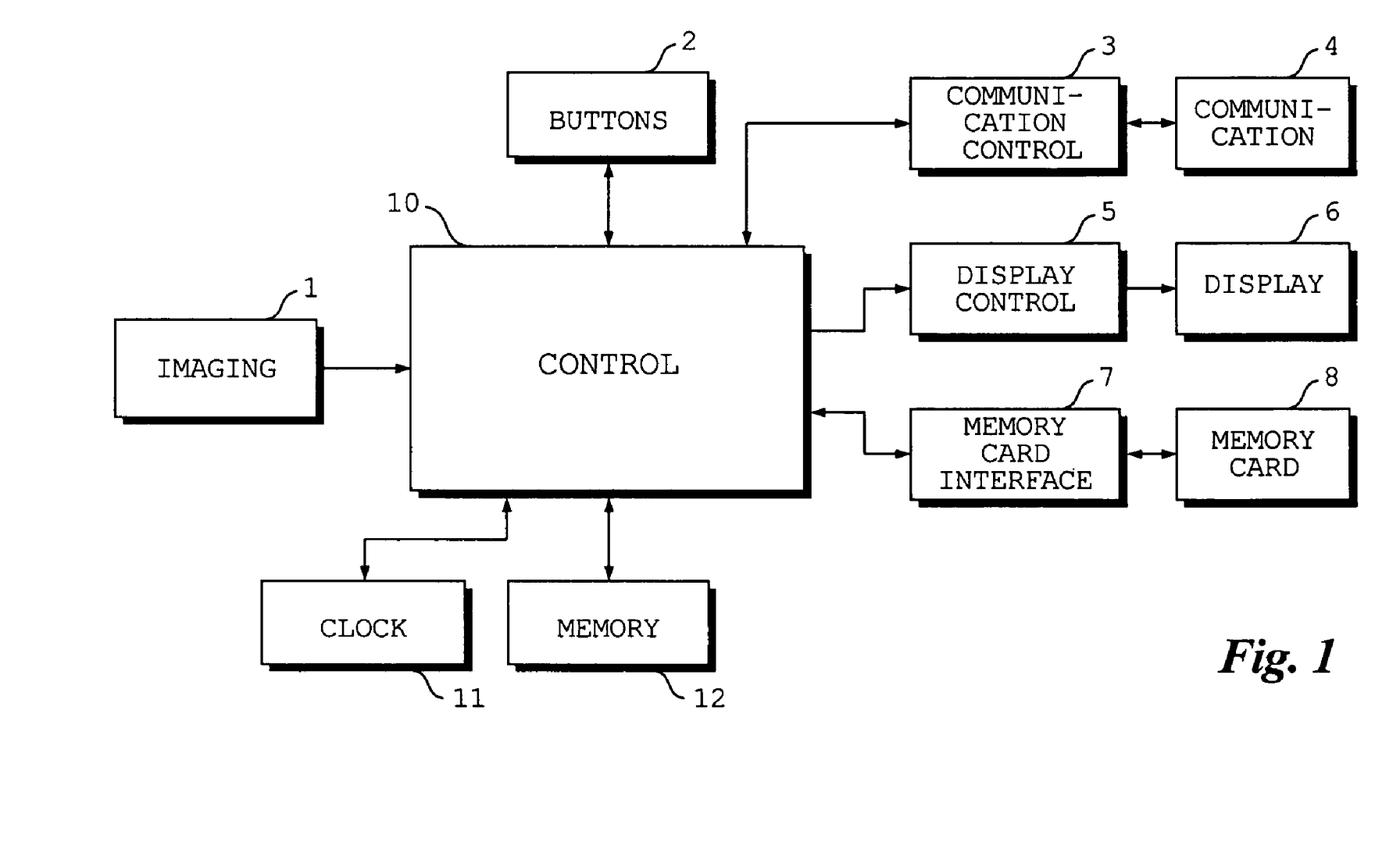
FIG. 1 is a block diagram illustrating the electrical structure of a digital still camera.

FIG. 1, which shows an embodiment of the present invention, illustrates the electrical structure of a digital still camera.

The overall operation of the digital still camera 1 is controlled by a control circuit 10.

The digital still camera is provided with buttons 2 such as a power button, shutter-release button, mode switch and menu button. Output signals from the buttons 2 are input to the control circuit 10. A shooting mode and playback mode, etc., are set by the mode switch.

A clock 11 for measuring shooting time and date and a memory 12 for storing an operating program and other data are connected to the control circuit 10.

The digital still camera according to this embodiment is capable of communicating with other devices. To accomplish this, the digital still camera is provided with a communication control circuit 3 and communication circuit 4. An operating program that controls an operation described later is also capable of being received by the communication circuit 4. The operating program received by the communication circuit 4 is applied to the memory 12 via the communication control circuit 3 and control circuit 10 and is stored in the memory 12. In a case where the operating program has been stored on a memory card, the operating program can be read from the memory card and installed in the digital still camera.

If the shooting mode is set, a picture of the subject is taken by an image sensing circuit 1. Image data representing the image of the subject is input to the control circuit 10. The latter executes prescribed signal processing such as a gamma correction and white balance adjustment and inputs the processed image data to a display control circuit 5. A display unit 6 is controlled by the display control circuit 5, whereby the image of the subject is displayed on the display screen of the display unit 6.

If the shutter-release button is pressed, the image data representing the image of the subject is input to the control circuit 10, as mentioned above. Data representing the shooting date and time measured by the clock 11 also is input to the control circuit 10. An image file is generated in the control circuit 10 and the image data and data representing the shooting time and date is planted in the image file generated. In this embodiment, images are grouped based upon the shooting date and time. Data indicative of an image group represented by the image data also is placed in the image file. In this embodiment, the user is capable of assigning a photographic scene (keyword) indicating what kind of scene is represented by the image about to be shot. The data indicative of this photographic scene also is planted in the image file. The generated image file is applied to and recorded on a memory card 8 via a memory card interface 7.

If the playback mode is set, an image file representing a desired image is read from among the number of image files that have been recorded on the memory card 8. The image file that has been read is applied to the display control circuit 5 via the memory card interface 7 and control circuit 10. Owing to control of the display unit 6 by the display control circuit 5, the image represented by the image file that has been read from the memory card 8 is displayed on the display screen of the display unit 6.

Figure 2:
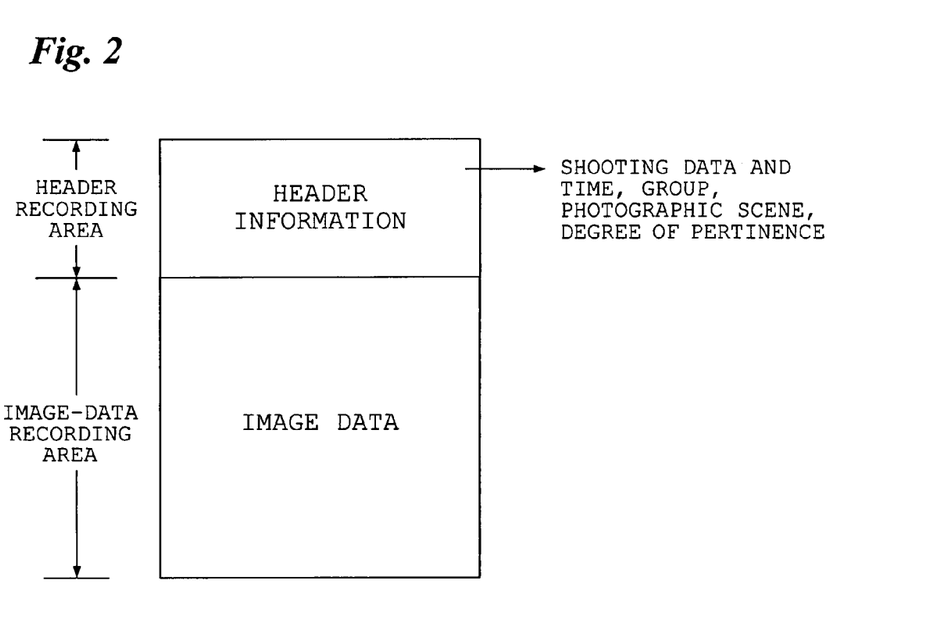
FIG. 2 illustrates an example of the file structure of an image file.

FIG. 2 illustrates an example of the file structure (data structure) of an image file.

The image file includes a header recording area and an image-data recording area.

Image data obtained by picture taking in the manner described above is recorded in the image-data recording area.

Header information such as image-file management data is recorded in the header recording area. In particular, data representing the shooting date and time, data indicative of a group and data indicative of a photographic scene and degree of pertinence of this photographic scene also are recorded in the header area, as mentioned above. Images related to a specific image (main image) can be displayed using these items of shooting date-and-time data, group data, photographic-scene data and data indicating degree of pertinence.

Figure 3:
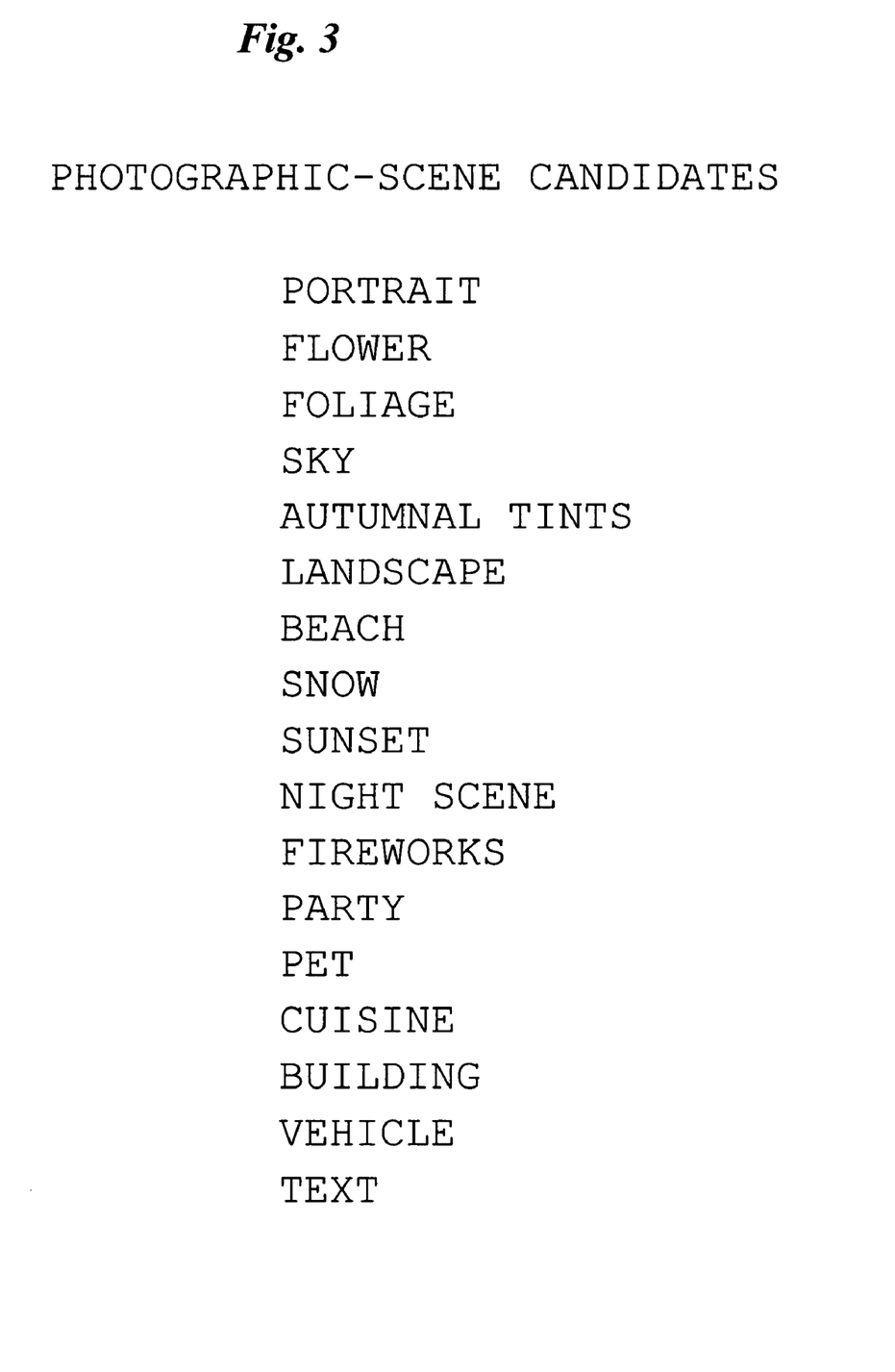
FIG. 3 illustrates an example of photographic scene candidates.

FIG. 3 illustrates an example of candidates of photographic scenes.

The candidates of photographic scenes represent scenes that can be selected by the user. The candidates are portrait, flower, foliage, sky, autumnal tints, landscape, beach, snow, sunset, night scene, fireworks, party, pets, cuisine, building, vehicle and text, etc. It goes without saying that photographic scenes other than these photographic-scene candidates can be set by the user.

Figure 4:
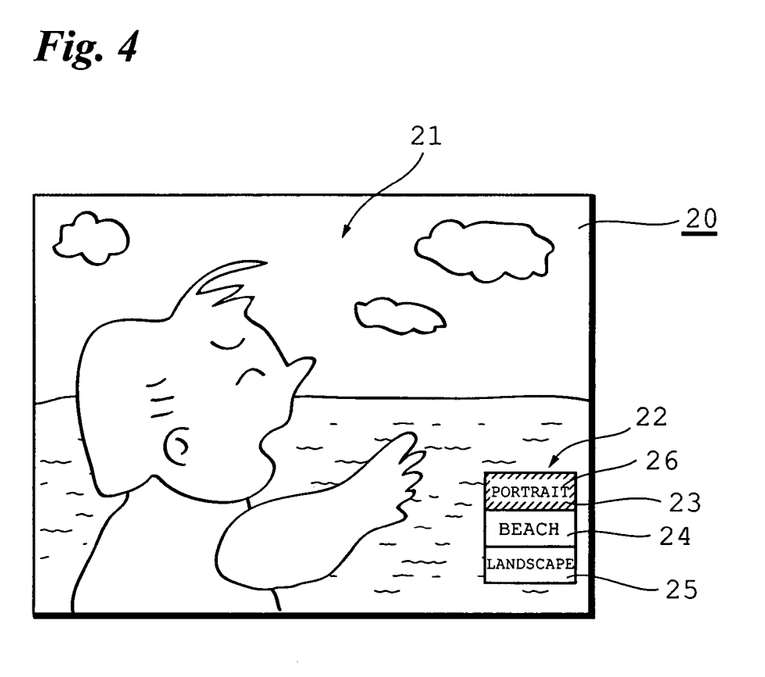
FIG. 4 illustrates an example of an image being displayed on a display screen.

FIG. 4 illustrates an example of the display screen of display unit 6.

If the menu button included among the switches 2 is pressed when taking a picture, a menu for setting a photographic scene appears on a display screen 20. If this menu is selected, then a photographic-scene selection menu 22 for selecting the photographic scene of a shot image 21 is displayed in the right-hand corner. A scene suited to the shot image 21 is selected and displayed from among photographic-scene candidates. The image 21 is that of a child swimming in the sea, and text 23 reading "PORTRAIT" representing a portrait scene, text 24 reading "BEACH" representing a beach scene, and text 25 reading "LANDSCAPE" representing a landscape scene is being displayed in the photographic-scene selection menu 22.

These photographic scenes are decided in the digital still camera based upon the image obtained by picture taking. For example, if the image of a face is detected within an image by face detection processing, then "PORTRAIT" is decided upon as the photographic scene. Photographic scenes are decided with regard to other scenes as well depending upon ratio of colors, etc.

The user is capable of inputting the degree of pertinence between these scenes and the image 21 being displayed. Among the items of text being displayed in the photographic-scene selection menu 22, an item of text whose characters have undergone a monochrome inversion (indicated by hatching 26 in this example) is the text (photographic scene) that has been selected. In response to depression of an up or down button among up, down, left, right buttons included among the buttons 2, the selected photographic scene changes from the presently selected photographic scene to the photographic scene above or below it. The degree of pertinence rises if the right button among the up, down, left, right buttons is pressed and declines if the left button is pressed. The degree of pertinence of the photographic scene that has been selected is input by pressing the right button or left button. In this embodiment, three levels of degree of pertinence can be set. If the degree of pertinence is zero, the data indicating the photographic scene is not placed in the image file. Data representing the set degree of pertinence and data representing the photographic scene is placed in the image file by pressing a decide button.

FIGS. 5 to 8 illustrate shot images. Photographic scenes, etc., are also being displayed.

Figure 5:
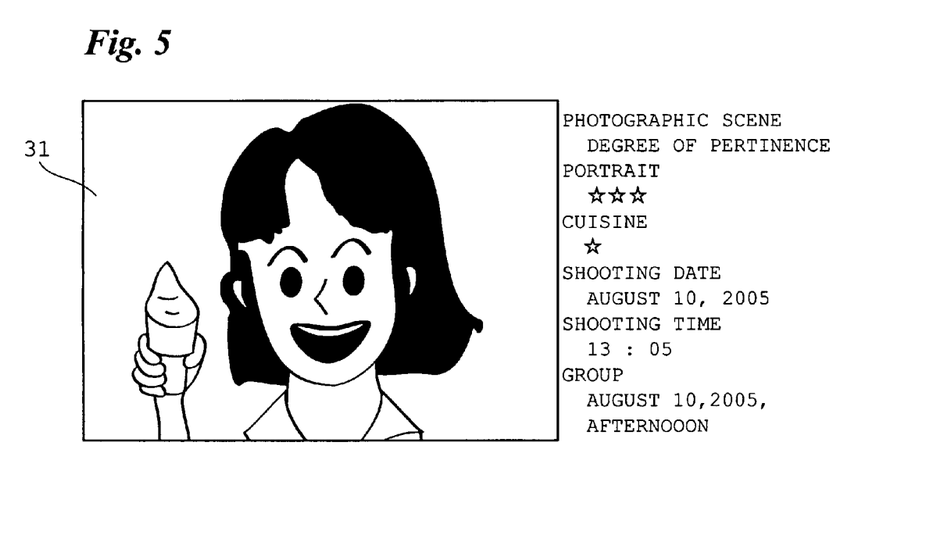
FIGS. 5 to 8 illustrate examples of images obtained by picture taking.

FIG. 5 illustrates an image 31 of a girl holding an ice cream cone. "PORTRAIT" with a degree of pertinence of 3 and "CUISINE" with a degree of pertinence of 1 have been set as the photographic scenes of image 31 (the degree of pertinence is indicated by the star symbols). The shooting date and shooting time have also been set. Furthermore, the group of image 31 has been set as "Aug. 10, 2005, AFTERNOON" based upon the shooting date and shooting time.

Figure 6:
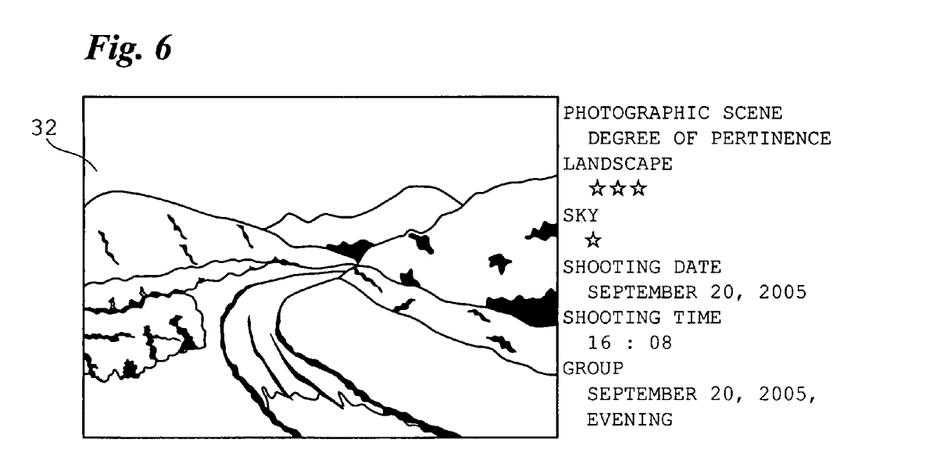

FIG. 6 illustrates an image 32 of a river landscape. "LANDSCAPE" with a degree of pertinence of 3 and "SKY" with a degree of pertinence of 1 have been set as the photographic scenes of image 32. The group of image 32 has been set as "Sep. 20, 2005, EVENING" based upon the shooting date and shooting time.

Figure 7:
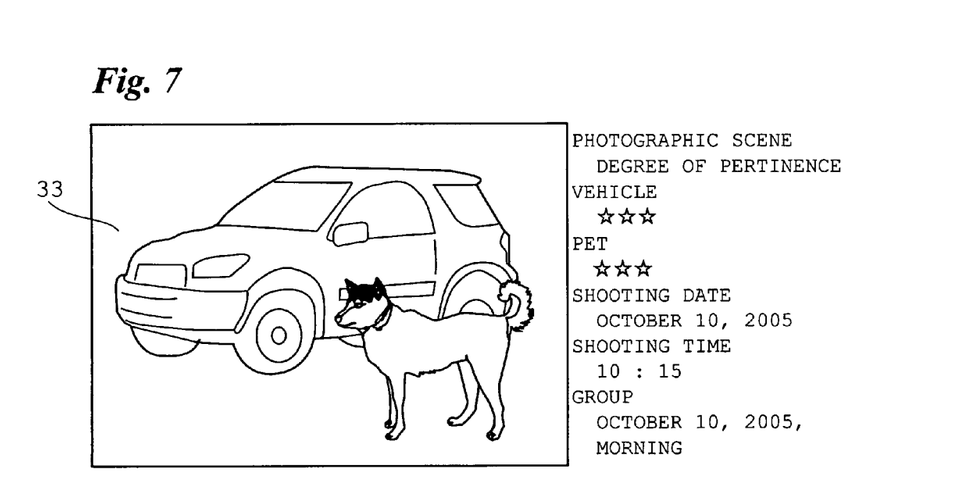

FIG. 7 illustrates an image 33 of an automobile and a dog. "VEHICLE" with a degree of pertinence of 3 and "PET" with a degree of pertinence of 3 have been set as the photographic scenes of image 33. The group of image 33 has been set as "Oct. 10, 2005, MORNING" based upon the shooting date and shooting time.

Figure 8:
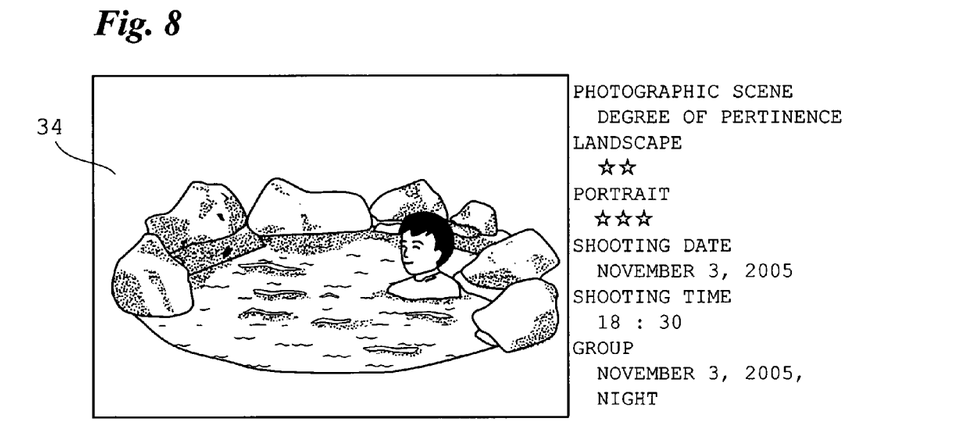

FIG. 8 illustrates an image 34 of a person in a spa. "LANDSCAPE" with a degree of pertinence of 2 and "PORTRAIT" with a degree of pertinence of 3 have been set as the photographic scenes of image 34. The group of image 34 has been set as "Nov. 3, 2005, NIGHT" based upon the shooting date and shooting time.

Thus, photographic scenes, degrees of pertinence and group are associated with an image. More specifically, data representing the photographic scenes, etc., of an image are placed in the header area of the image file in which the image data representing the image has been recorded in the image-data recording area in the manner described above.

Figure 9:
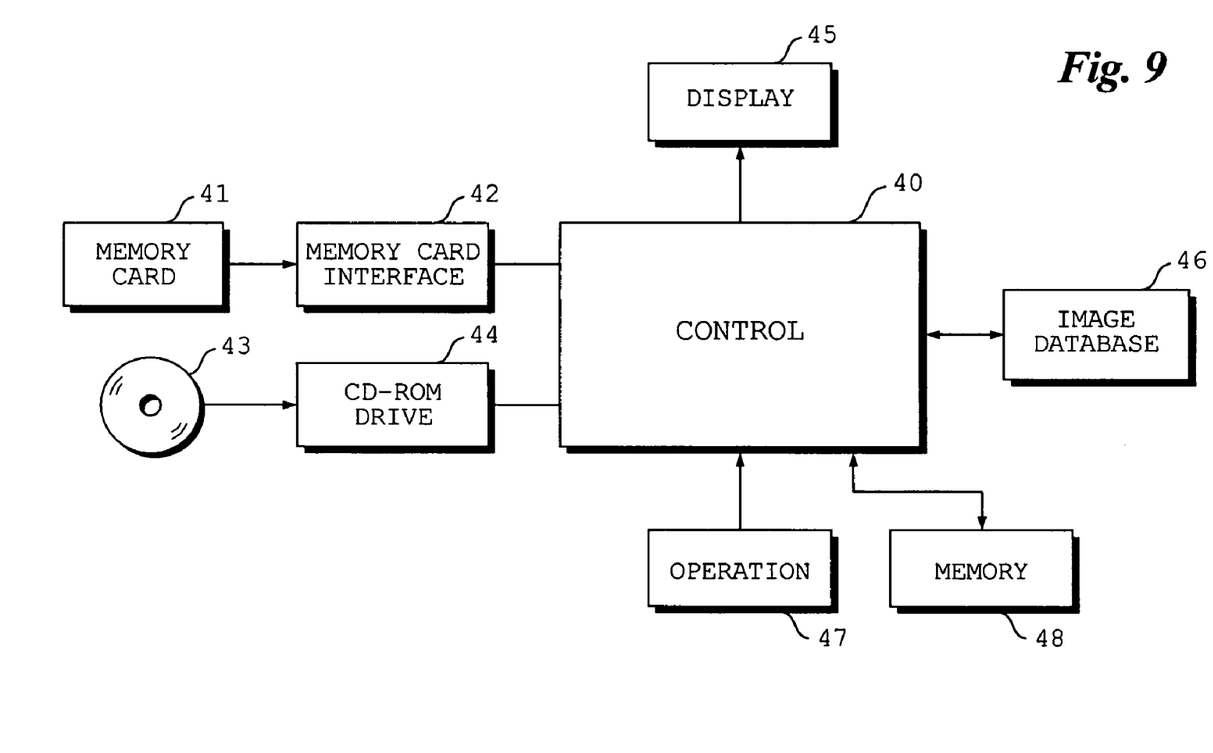
FIG. 9 is a block diagram illustrating the electrical structure of an image reproducing apparatus.

FIG. 9 is a block diagram illustrating the electrical structure of an image reproducing apparatus.

The overall operation of the image reproducing apparatus is controlled by a control circuit 40. The control circuit 40 is supplied with the output signal of an operating device 47 that includes a photo surfing key and a decide button. An image database (hard-disk drive and hard disk) 46 is connected to the control circuit 40. A number of image files containing data representing photographic scenes and the like have been recorded in the image database 46, as mentioned above. Furthermore, a display unit 45 for displaying images represented by the image files that have been recorded in the image database 46 also is connected to the control circuit 40. A memory 48 also is connected to the control circuit 40.

The image reproducing apparatus includes a memory card interface 42 and a CD-ROM (Compact Disk-Read-Only Memory) driver 44. Image files that have been recorded on a memory card 41 and on a CD-ROM 43 are read by the memory card interface 42 and CD-ROM drive 44, respectively, and are applied to the image database 46.

Further, a CD-ROM on which an operating program for performing the operation described below has been recorded is loaded in the image reproducing apparatus and the operating program is read, whereby the operating program is installed in the image reproducing apparatus.

Figure 10:
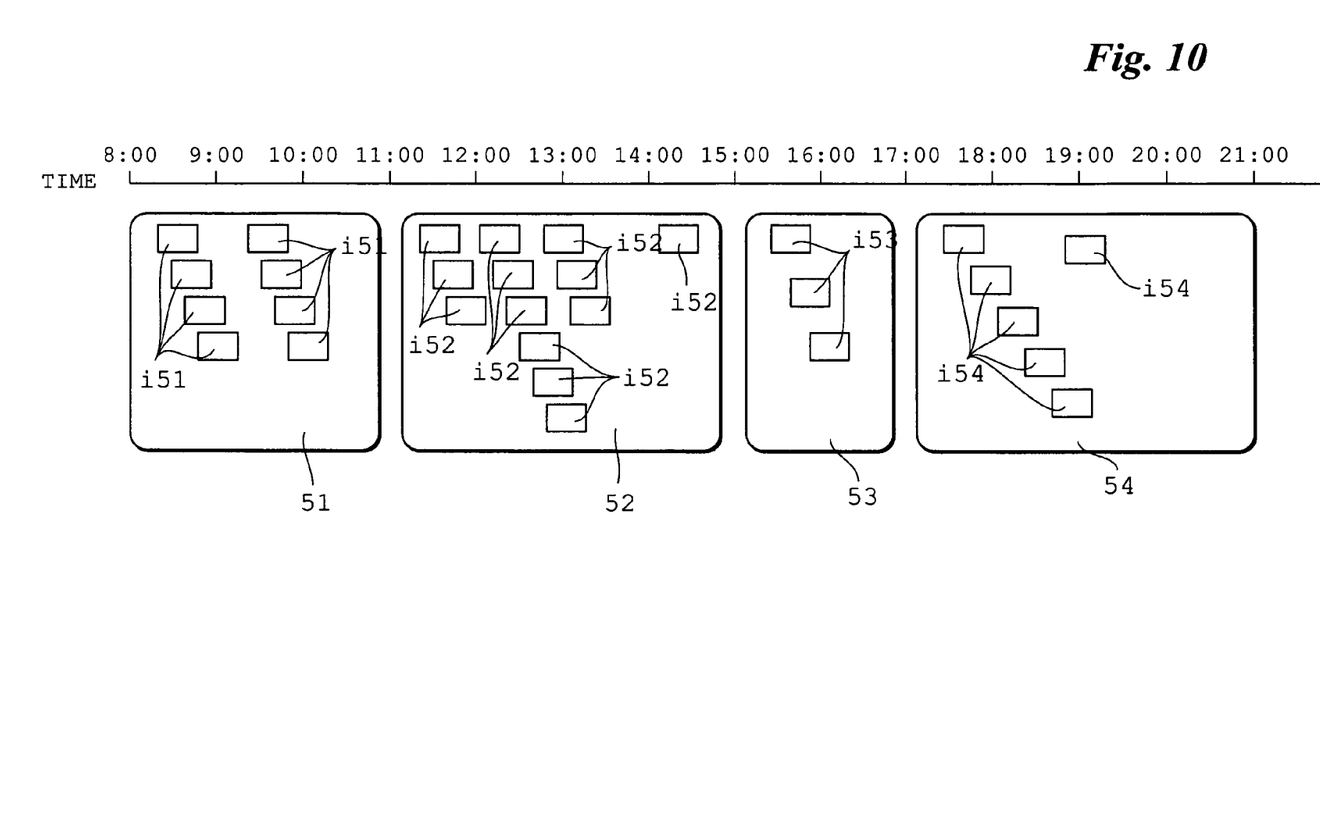
FIG. 10 illustrates the manner shot images are grouped.

FIG. 10 illustrates the manner in which a number of images have been classified in the image database 46.

As mentioned above, images obtained by picture taking have been grouped based upon shooting date and time. In a single day, morning is defined as 8:00 to 11:00, afternoon as 11:00 to 15:00, evening as 15:00 to 17:00, and night as 17:00 to 21:00. It goes without saying that other time periods are defined as late night and early morning, etc. A unique group is defined by the combination of morning, afternoon, evening or night, etc., which is decided by the shooting time, and the shooting date. For example, if images are those that were shot on Aug. 21, 2005, then, in accordance with the shooting time, the images are divided into a group 51 "Aug. 21, 2005, Morning", a group 52 "Aug. 21, 2005, Afternoon", group 53 "Aug. 21, 2005, Evening", and a group 54 "Aug. 21, 2005, Night". Images i51, i52, i53, i54 classified by these groups 51, 52, 53, 54 are assumed to belong to respective ones of these groups.

In this embodiment, grouping is performed based upon shooting date and time. However, it goes without saying that it will suffice if simple grouping is carried out, and grouping need not necessarily be performed based upon shooting date and time.

Figure 11:
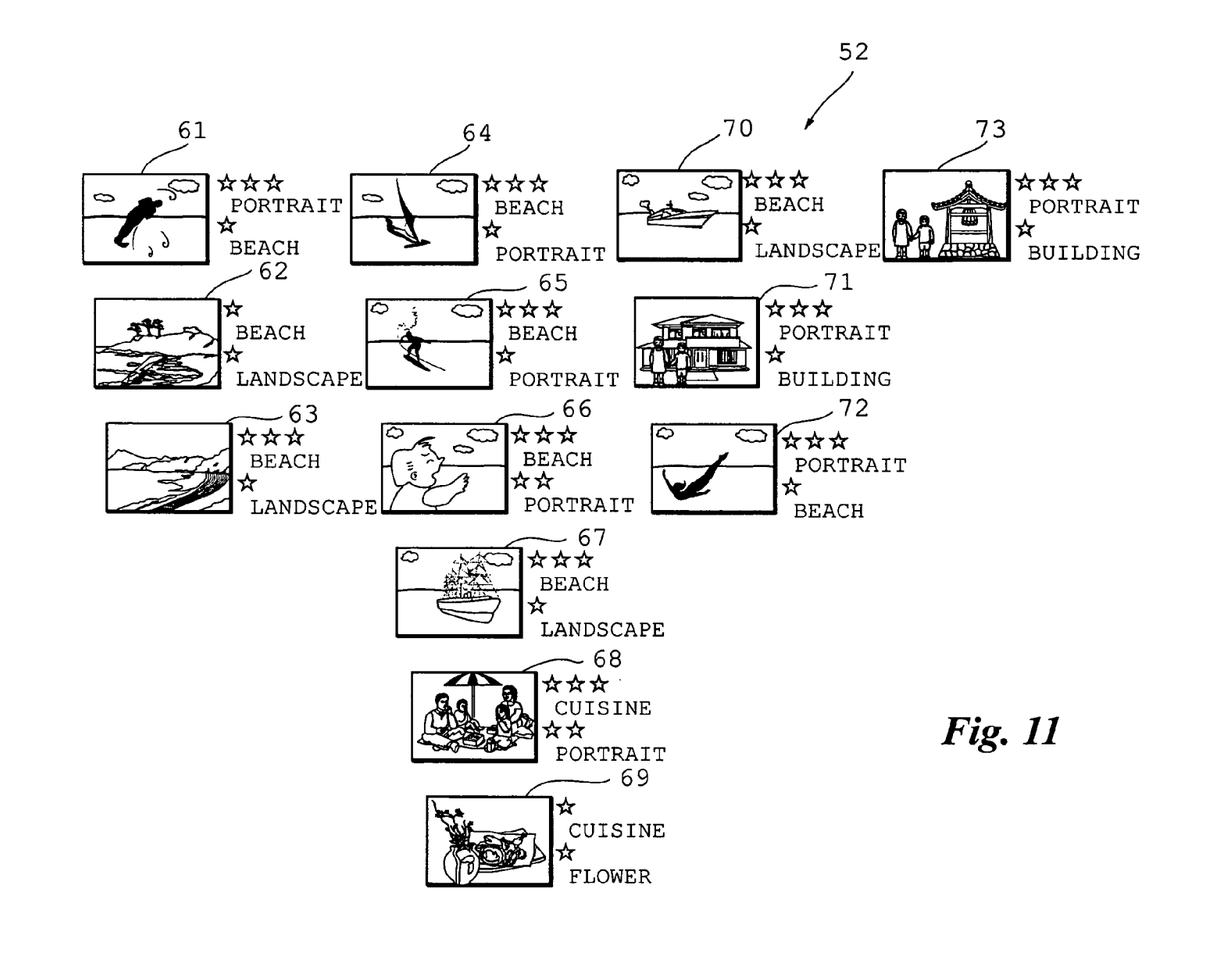
FIG. 11 illustrates an example of grouped images.

FIG. 11 illustrates the group "Aug. 21, 2005, Afternoon".

Images 61 to 73 (which correspond to images i52 in FIG. 10) are illustrated as images belonging to group 52. Further, the photographic scenes of the images 61 to 73 are shown with the star symbols indicating the degree of pertinence.

Figure 12:
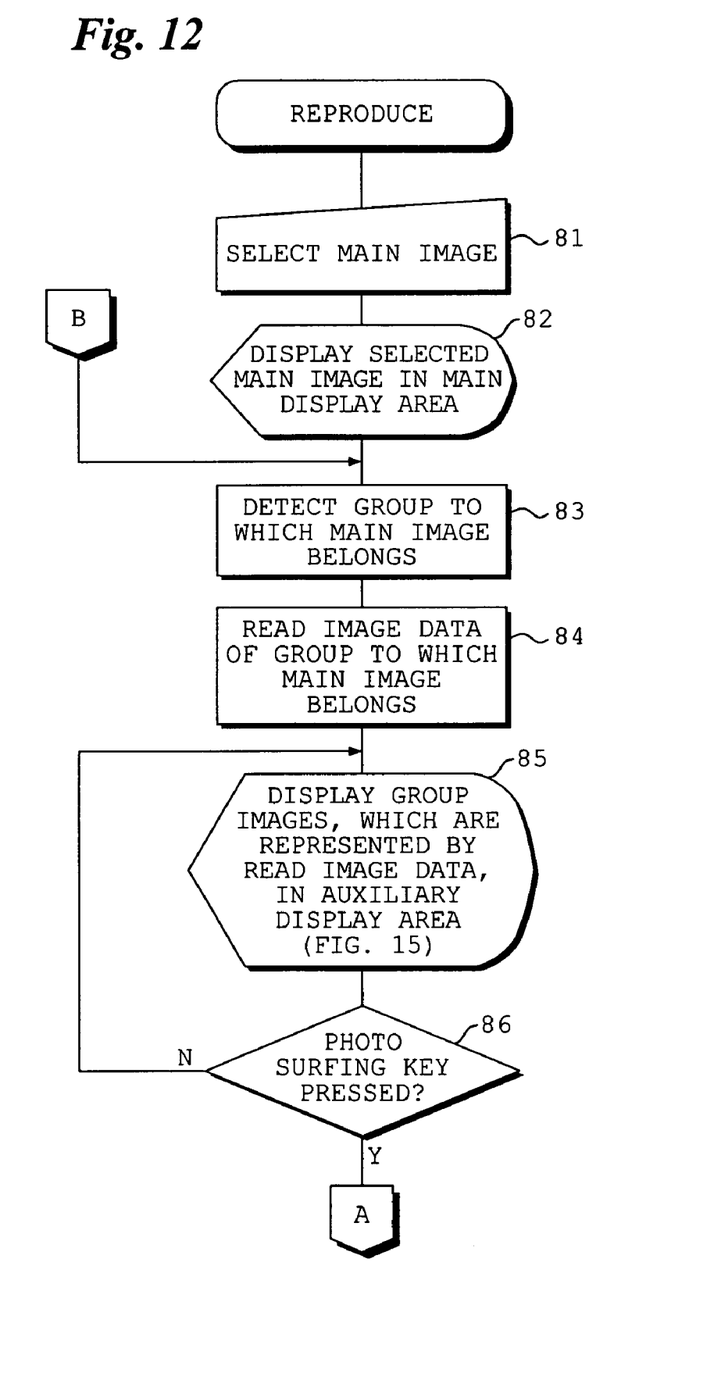
FIGS. 12 and 13 are flowcharts illustrating part of the procedure of reproduction processing.
Figure 13:
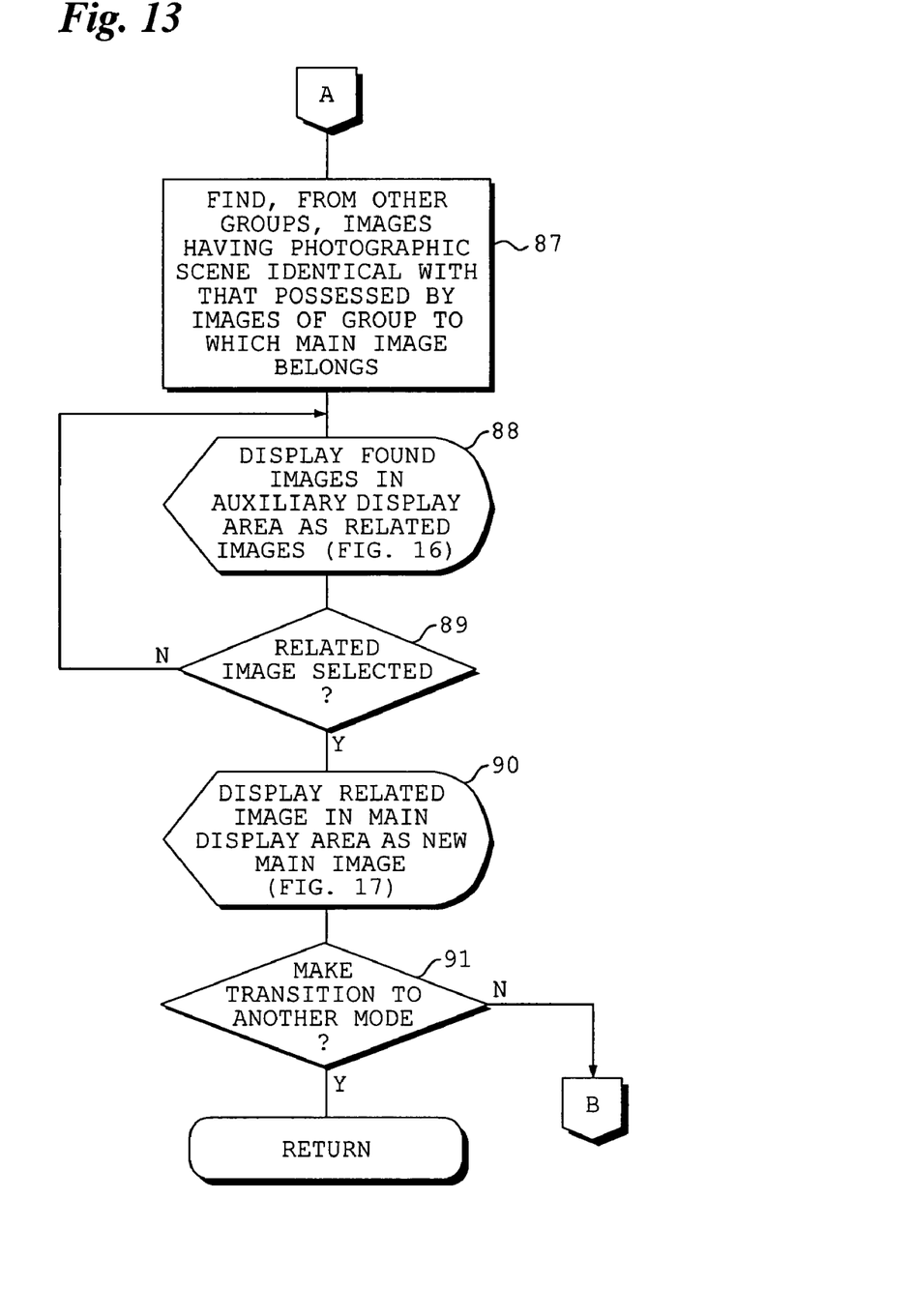

FIGS. 12 and 13 are flowcharts illustrating processing executed by the image reproducing apparatus. FIGS. 14 to 17 illustrate display screens of the display unit 45 included in the image reproducing apparatus.

In this embodiment, a desired image (main image) that the user wishes to view and images (group images; related images) related to the main image are displayed.

Figure 14:
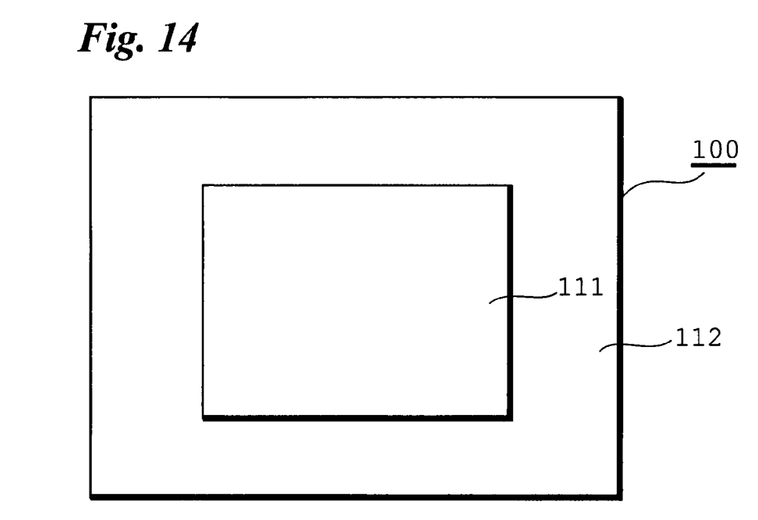
FIG. 14 illustrates a main display area and an auxiliary display area.

With reference to FIG. 14, an area having a comparatively large central portion is defined on a display screen 100 of the display unit 45 as a main display area 111 that displays the main image. An auxiliary display area 112 is defined around the main display area 111.

With reference to FIG. 12, the operating device 47 is operated by the user to select the main image (step 81). The main image selected is displayed in the main display area 111 of display screen 100 (step 82).

When this is done, the group to which the selected main image belongs is detected (step 83). Image files (image data) representing the images belonging to the detected group (referred to as "group images" below) are read from the image database 46 (step 84). Reduction processing is executed in such a manner that the group images represented by the read image files become smaller in size than the main image being displayed in the main display area 111. The group images of reduced size are displayed in the auxiliary display area 112 of the display screen 100 (step 85).

Figure 15:
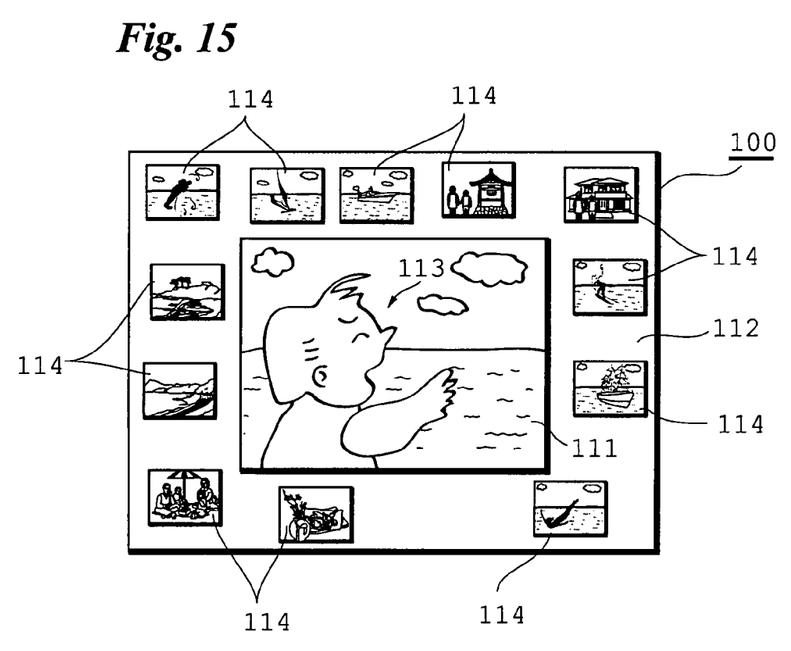
FIGS. 15 to 17 illustrate examples of images being displayed on a display screen.

As shown in FIG. 15, a main image 113 that has been selected by the user is being displayed in the main display area 111. Reduced-size group images 114 in the group to which the main image 113 belongs are being displayed in the auxiliary display area 112. By observing the reduced-size group images 114, the user can determine what kind of images are contained in the group to which the main image belongs, i.e., what images were shot on the same day as the day on which the main image was shot and in approximately the same time period.

With reference again to FIG. 12, if the photo surfing button is pressed when the main image is being displayed in the main display area 111 and the reduced-size group images 114 are being displayed in the auxiliary display area 112 ("YES" at step 86) (this corresponds to input of a related-image display command), then images having a photographic scene identical with the photographic scene that has been assigned to the main image being displayed in the main display area 111 (if a plurality of scenes have been assigned to the main image, then the images may be those for which all of the plurality of photographic scenes are the same or images that have at least one of the photographic scenes in common) are detected from groups that are different from the group to which the main image belongs (step 87 in FIG. 13). In a case where a number of images are detected, representative images are found on a per-group basis.

Size reduction processing is applied to the detected images belonging to the other groups and the images of reduced size are displayed in the auxiliary display area 112 as related images (step 88).

Figure 16:
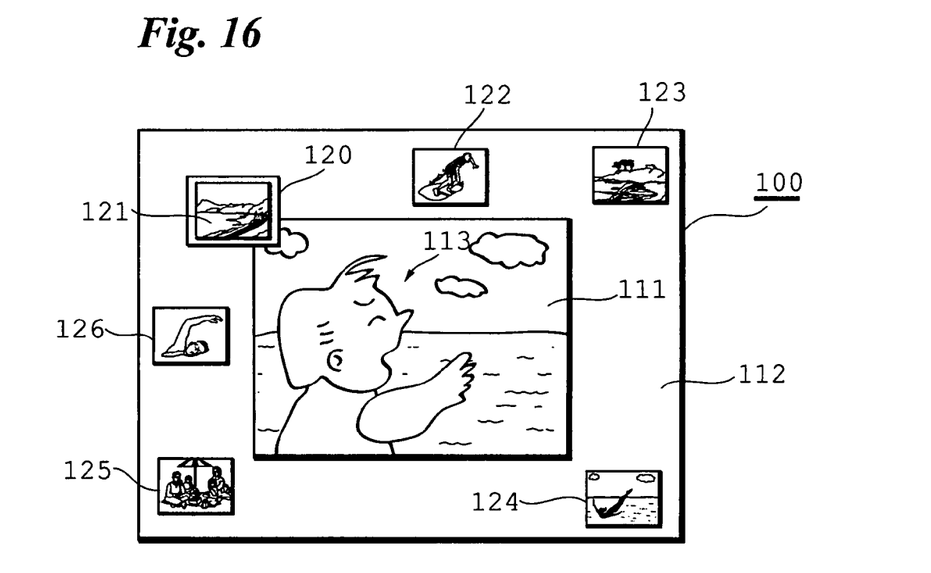

As illustrated in FIG. 16, the main image 113 is being displayed in the main display area 111. Here it is assumed that the "PORTRAIT" photographic scene and the "BEACH" photographic scene have been assigned to the main image 113. Images 120 to 126 to which both the "PORTRAIT" and "BEACH" assigned to the main image 113 have been assigned and which belong to groups different from the group to which main image 113 belongs are being displayed in the auxiliary display area 112 as related images. The related images 120 to 126 are smaller in size than the main image 113. A cursor 120 is being displayed around one related image 121 among the related images 121 to 126. The cursor 120 is moved so as to enclose an adjacent related image in accordance with depression of an arrow button included in the operating device 47. The related images 121 to 126, which have a comparatively high degree of pertinence to the main image, are thus displayed.

With reference again to FIG. 13, if the decide button included in the operating device 47 is pressed ("YES" at step 89), then the related image enclosed by the cursor is made the new main image and is displayed in the main display area 111 (step 90). If a transition to another mode is not made ("NO" at step 91), then the group to which this new main image belongs is detected (step 83), the image data of the group to which the new main image belongs is read (step 84) and the group images are displayed in the auxiliary display area (step 85).

Figure 17:
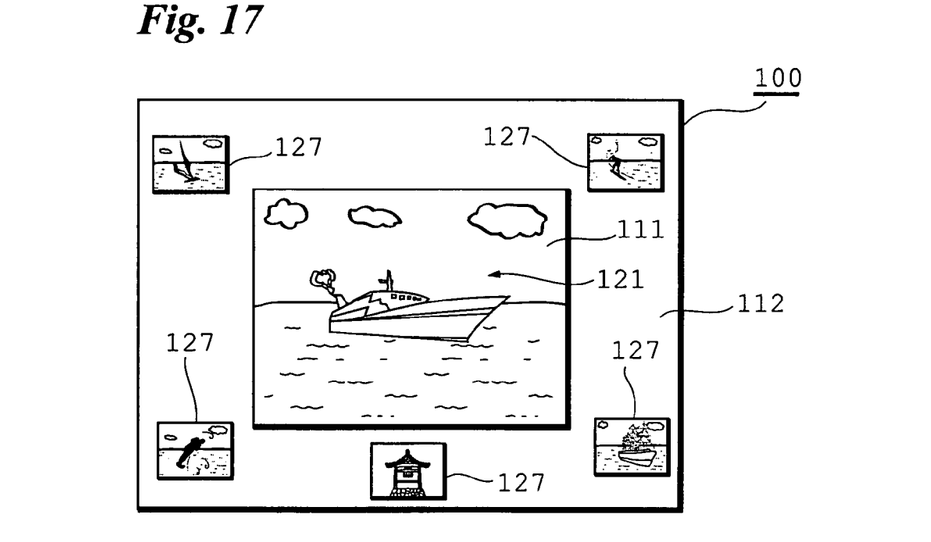

With reference again to FIG. 16, here it is assumed that the decide button has been pressed in a case where the related image 121 is enclosed by the cursor 120. As a result, the related image 121 is made the new main image and is displayed in the main display area 111, as illustrated in FIG. 17. Images 127 contained in the group to which the new main image belongs are displayed in the auxiliary display area 112.

As many apparently widely different embodiments of the present invention can be made without departing from the spirit and scope thereof, it is to be understood that the invention is not limited to the specific embodiments thereof except as defined in the appended claims.

What is claimed is:

1. An image reproducing apparatus comprising:
    a first reading device for reading image data and keyword data representing a desired image from a recording medium on which a number of sets of image data and keyword data have been grouped and recorded, the image data representing an image obtained by picture taking and the keyword data representing a keyword of the image, the image data and keyword data in each set being interrelated;
    a first display control device for controlling a display device in that a first image represented by the image data read by said first reading device is displayed on a display screen;
    a command input device for inputting a related-image display command;
    a second reading device for reading, from the recording medium in response to the related-image display command that has been input from said command input device, image data which is related to keyword data indicative of a keyword identical with the keyword of the first image being displayed under the control of the first display control device, and which is contained in groups different from the group to which the first image belongs;
    a first reducing device for reducing the image, which is represented by the image data that has been read by said second reading device, to a size smaller than that of the first image; and
    a second display control device for controlling the display device in that the image reduced in size by the first reducing device is displayed as a related image on the display screen displaying the first image.

2. The apparatus according to claim 1, further comprising:
    a selecting device for selecting the related image;
    a second reducing device for reducing an image, which is represented by image data contained in a group to which image data representing the related image selected by the selecting device belongs, to a size smaller than that of the main image; and
    a third display control device for controlling the display device in that the image reduced in size by said second reducing device is displayed on the display screen that is displaying the first image.

3. The apparatus according to claim 1, wherein the keyword is a photographic scene.

4. The apparatus according to claim 3, further comprising:
    a fourth display control device for controlling the display device in that an image given the keyword and a photographic menu are displayed on the display screen;
    wherein the photographic seen displayed in the photographic menu becomes the keyword.

5. The apparatus according to claim 1, wherein the number of sets of image data and keyword data have been grouped based upon a shooting date and shooting time.

6. A method of controlling an image reproducing device, comprising the steps of:
    reading by a first reading device image data and keyword data representing a desired image from a recording medium on which a number of sets of image data and keyword data have been grouped and recorded, the image data representing an image obtained by picture taking and the keyword data representing a keyword of the image, the image data and keyword data in each set being interrelated;
    controlling a display device by a first display control device in that a first image represented by the image data read by the first reading device is displayed on a display screen;
    reading by a second reading device, from the recording medium in response to a related-image display command that has been input, image data which is related to keyword data indicative of a keyword identical with the keyword of the first image being displayed under the control of the first display control device, and which is contained in groups different from the group to which the first image belongs;

reducing the image, which is represented by the image data that has been read by the second reading device, to a size smaller than that of the first image by a reducing device; and controlling the display device in such a manner that the image reduced in size by the reducing device is displayed as a related image on the display screen displaying the first image.

7. A computer-readable medium, storing a program, executed by a processor, for causing a computer of an image reproducing apparatus to execute the following steps:

reading image data and keyword data representing a desired image from a recording medium on which a number of sets of image data and keyword data have been grouped and recorded, the image data representing an image obtained by picture taking and the keyword data representing a keyword of the image, the image data and keyword data in each set being interrelated;

controlling a display device in a first image represented by the read image data is displayed on a display screen;

reading, from the recording medium in response to a related-image display command that has been input, image data which is related to keyword data indicative of a keyword identical with the keyword of the first image being displayed under the control of the first display control device, and which is contained in groups different from the group to which the first image belongs;

reducing the image, which is represented by the read image data, to a size smaller than that of the first image; and controlling the display device in such a manner that the image that has been reduced in size is displayed as a related image on the display screen displaying the first image.

* * * * *